United States Patent [19]
Maeda et al.

[11] Patent Number: 5,743,943
[45] Date of Patent: Apr. 28, 1998

[54] EVAPORATED FUEL ADSORBING CANISTER PREVENTING DIFFUSION OF FUEL THERETHROUGH

[75] Inventors: Kazuto Maeda, Nisshin; Nobuhiko Koyama, Nagoya; Naoya Kato, Ama-gun, all of Japan

[73] Assignees: Nippondenso Co., Ltd., Kariya; Nippon Soken Inc., Nishio, both of Japan

[21] Appl. No.: 677,370

[22] Filed: Jul. 5, 1996

[51] Int. Cl.$^6$ .................................................. B01D 53/04
[52] U.S. Cl. .......................... 96/126; 96/130; 96/131; 96/144; 96/152; 123/519
[58] Field of Search ........................ 96/108, 121, 122, 96/126, 130, 131, 144, 152, 154; 123/516, 518–521

[56] References Cited

U.S. PATENT DOCUMENTS

| | | | |
|---|---|---|---|
| 3,734,293 | 5/1973 | Biskis | 96/126 X |
| 4,203,401 | 5/1980 | Kingsley et al. | 96/130 X |
| 4,308,840 | 1/1982 | Hiramatsu et al. | 96/130 X |
| 4,655,189 | 4/1987 | Koga | 123/519 X |
| 4,658,796 | 4/1987 | Yoshida et al. | 96/144 X |
| 5,173,095 | 12/1992 | Yasukawa et al. | 96/122 |
| 5,207,808 | 5/1993 | Haruta et al. | 96/131 |
| 5,304,235 | 4/1994 | Watanabe et al. | 96/144 |
| 5,456,236 | 10/1995 | Wakashiro et al. | 123/519 |
| 5,460,136 | 10/1995 | Yamazaki et al. | 123/519 |
| 5,501,723 | 3/1996 | Andress et al. | 96/152 X |

FOREIGN PATENT DOCUMENTS

| | | |
|---|---|---|
| 5-187330 | 7/1993 | Japan. |
| 5-187331 | 7/1993 | Japan. |

*Primary Examiner*—Robert Spitzer
*Attorney, Agent, or Firm*—Cushman, Darby & Cushman IP Group of Pillsbury, Madison & Sutro LLP

[57] ABSTRACT

A canister which can control the diffusion of evaporated fuel to surely prevent the evaporated fuel from blowing through into the atmosphere has a main chamber having therein a first adsorbent layer for adsorbing evaporated fuel and including an evaporated fuel lead-in port and a purge port, a subchamber having therein a second adsorbent layer for adsorbing evaporated fuel and including an atmospheric air lead-in port, and an air chamber communicating with the main chamber and the subchamber are provided in a casing of a canister. The air chamber is divided into three parts: a first chamber at the side of the main chamber, a second chamber at the side of the subchamber and a third chamber between the first and second chambers. A nonlinear communication passage is formed inside of the third chamber by dividing the third chamber with a partition wall having its both ends opened to the first chamber and the second chamber respectively. Since the communication passage can be sufficiently long, a canister with both diffusion prevention and low pressure loss can be obtained.

32 Claims, 5 Drawing Sheets

EVAPORATED FUEL ADSORBING CANISTER PREVENTING DIFFUSION OF FUEL THERETHROUGH

CROSS-REFERENCE TO RELATED APPLICATION

The present application is related to and claims priority from Japanese Patent Application No. Hei 7-195895, incorporated herein by reference.

BACKGROUND OF THE INVENTION

1. Field of the Invention

The present invention relates to a canister which adsorbs fuel evaporated from a fuel tank so as to prevent the evaporated fuel from being released outside of the vehicle.

2. Description of Related Art

The fuel evaporated from a fuel tank when a vehicle is not in use is generally guided by a canister filled with adsorbent material such as activated carbon or the like and kept adsorbed for a while. When negative pressure generated when starting the engine is applied, the adsorbed evaporated fuel then separates from the adsorbent by means of the atmosphere introduced into the canister and is sent to the air intake system.

At this point, since the evaporated fuel adsorbed by the adsorbent layer is diffused in the adsorbent layer as time passes, this introduces a problem that the diffused evaporated fuel gets to the adsorbent layer edge while the vehicle is left for a long time so that the evaporated fuel is released to the atmosphere. Therefore, some canister designs have been proposed to alleviate this problem. One is a canister divided into a main chamber including an evaporated fuel lead-in port and a purge port, and a subchamber smaller than the main chamber and including an atmospheric air lead-in port, both of which are communicated by means of an air chamber so that the evaporated fuel released from the main chamber is captured in the subchamber. Another canister design includes the feature that the air chamber is divided into two small chambers at a main chamber side and a subchamber side providing an aperture connecting both small chambers to make it difficult for the evaporated fuel to flow into the small chamber at the subchamber side. In addition to the above two designs, as described in Japanese Patent Application Laid-Open Nos. Hei 5-187330 and Hei 5-187331, there has been an other well-known canister design including a projecting pipe passage connected to the aperture and projecting into the air chamber at the main chamber side to further limit the movement of the evaporated fuel by increasing the distance between the air chambers of the main chamber side and the subchamber side.

Incidentally, according to the ORVR regulation to be enforced in the United States beginning in 1998, which regulates the diffusion of the evaporated fuel from the fuel opening into the atmosphere, the evaporated fuel flowing from the fuel tank to the canister is increased. At this time, as for the structure with the above-mentioned aperture, refueling tends to be difficult because the pressure loss in the canister is increased and the pressure in the fuel tank is also increased. Even the structure with the above-mentioned projecting pipe passage needs to reduce the passage area of the projecting pipe passage in order to prevent the diffusion because the distance to the air chamber of the subchamber side cannot be long enough to provide sufficient restriction with a normal passage area. Therefore, it has been difficult to obtain a canister which can both prevent the diffusion and obtain a structure with low pressure loss.

SUMMARY OF THE INVENTION

The present invention has been made in order to solve the above-mentioned problem and an object of the present invention is to provide a canister with a low pressure loss structure which can control the diffusion of evaporated fuel to surely prevent the evaporated fuel from blowing through into the atmosphere.

In order to attain the above-mentioned object, a canister according to a first aspect of the present invention includes a main chamber having therein a first adsorbent layer adsorbing evaporated fuel and including an evaporated fuel lead-in port and a purge port, a subchamber having therein a second adsorbent layer adsorbing evaporated fuel and including an atmospheric air lead-in port, and an air chamber connecting the main chamber and the subchamber. The air chamber is divided into three parts: a first chamber at the main chamber side, a second chamber at the subchamber side, and a third chamber provided between the first and second chambers. The third chamber is further partitioned inside by a partition wall to form a nonlinear communication passage. The ends of the communication passage are opened to the first chamber and the second chamber, respectively.

Since the long communication passage is connected to both the main chamber and the subchamber in the first embodiment, the diffusion of the evaporated fuel from the main chamber to the subchamber is controlled. Besides, since the communication passage is sufficiently long enough to prevent the diffusion, the low pressure loss structure can be maintained without any aperture in the communication passage. Furthermore, as the communication passage is constituted by dividing the air chamber with the partition wall, the required passage length can be assured by making good use of the limited space, thereby the canister itself will not be oversized.

A canister according to a second aspect of the present invention includes a main chamber having therein a first adsorbent layer adsorbing evaporated fuel and including an evaporated fuel lead-in port and a purge port, a subchamber having therein a second adsorbent layer adsorbing evaporated fuel and including an atmospheric air lead-in port, at least one middle chamber disposed between the main chamber and the subchamber and having therein a third adsorbent layer, and a plurality of air chambers connected to each of the chambers. The interior of at least one of the air chambers is divided into the three chambers in the same way as the first structure, and a communication passage is provided inside of the third chamber.

Accordingly, the canister according to the second aspect of the invention having at least one middle chamber can control the diffusion of the evaporated fuel and lower the pressure loss in the same way as the first structure by providing the communication passage in at least one of the air chambers.

In a canister according to a third aspect of the present invention, the third chamber is further divided into plural chambers, each of which is partitioned by a partition wall so that plural communication passages are formed. The ends of each communication passage are opened to the main chamber and the subchamber respectively.

Since the canister according to the third aspect of the present invention is provided with the plural communication passages which are open to the first chamber and the second chamber, the vapor flow from the main passage and the air chamber is scattered so that the adsorption is hardly partial to one part of the first adsorption layer. Therefore, the outer periphery of the first adsorbent layer, especially an adsorbent at a corner portion thereof, can be effectively utilized, thereby improving the adsorption efficiency. Further, in purging, since the introduced atmosphere spreads all over up to the outer periphery of the subchamber, the purge efficiency is improved.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1A:
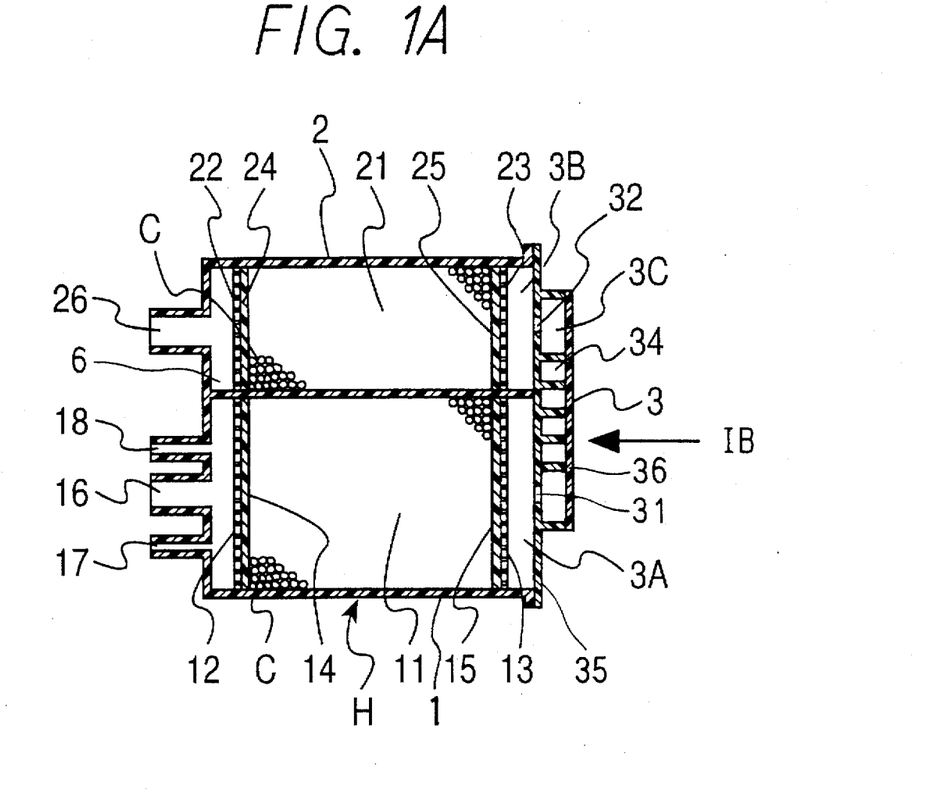
FIG. 1A is a cross-sectional view illustrating a whole canister according to a first embodiment of the present invention.

A first embodiment of the present invention will now be described with reference to the drawings. As illustrated in FIG. 1A, the interior of a box-shaped casing H is divided by a partition wall 6 into upper and lower parts. The lower part is a main chamber 1 and the upper part is a subchamber 2 which is smaller than main chamber 1 in capacity. Main chamber 1 includes an adsorbent layer 11 filled up with activated carbon between a pair of porous plates 12 and 13, and filters 14 and 15 disposed inside of the above-mentioned porous plates 12 and 13 respectively for preventing the activated carbon from falling out. Subchamber 2 includes an adsorbent layer 21 supported by porous plates 22 and 23 on opposite sides thereof, and filters 24 and 25 are respectively provided between the adsorbent layer 21 and each of porous plates 22 and 23.

One end portion (the left end portion in FIG. 1A) of main chamber 1 is connected to an evaporated fuel lead-in port 16, through which the fuel evaporated from a fuel tank (not shown) is introduced into main chamber 1. A purge port 17 for leading out the evaporated fuel separated from adsorbent layer 11 to an engine intake passage and a secondary fuel lead-in port 18 connected to the fuel tank via a tank internal pressure valve and mainly introducing the evaporated fuel during times other than fueling are provided in the vicinity of fuel lead-in port 16. In addition, fuel lead-in port 16 is set to introduce the evaporated fuel only when fueling by opening the valve disposed between the canister and the fuel tank when fueling. One end portion (the left end portion in FIG. 1A) of subchamber 2 is connected to an atmospheric air lead-in port 26 introducing air into subchamber 2.

An air chamber 3 is formed between porous plates 13 and 23 which are the right end surfaces of main chamber 1 and subchamber 2 and casing H. This air chamber 3 is divided into three parts: a first chamber 3A facing main chamber 1, a second chamber 3B facing subchamber 2 and a third chamber 3C located at the right side of both first and second chambers 3A and 3B. Third chamber 3C is connected to first chamber 3A and second chamber 3B respectively at openings 31 and 32.

As can be seen in FIG. 1A, the third chamber 3C is defined by a casing portion 35 forming one wall of the casing H and a cover portion 36 on a side of the casing portion 35 opposite the casing H. Preferably, casing H, casing portion 35 and cover portion 36 are made of resin or nylon such as nylon 6, 6 and are ultrasonically welded together.

Figure 1B:
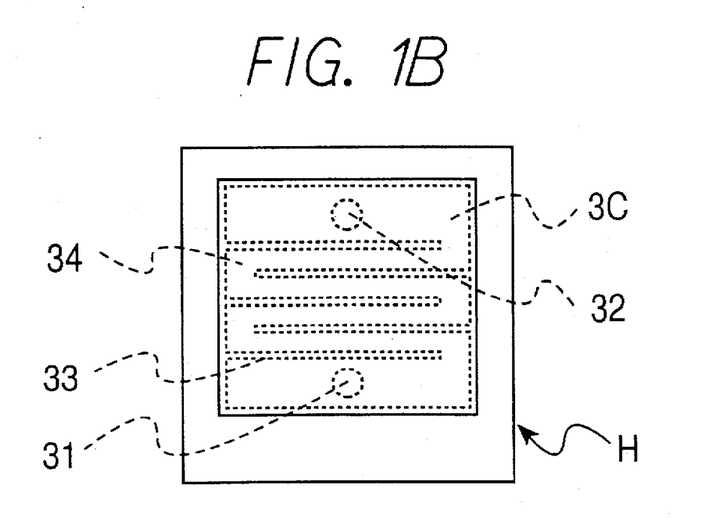
FIG. 1B is a view in the direction of the arrow IB in FIG. 1A.

Inside of the above-mentioned third chamber 3C is provided a plurality of partition walls 33 (shown most clearly in FIG. 1B) in parallel, each end of which is fixed alternately to the right and the left side wall as illustrated in FIG. 1B to obtain a zigzag-shaped communication passage 34. The above-mentioned openings 31 and 32 are disposed at opposite ends of this communication passage 34 to provide a sufficient distance between first chamber 3A and second chamber 3B to prevent diffusion. Openings 31 and 32 respectively face fuel lead-in port 16 and atmospheric air lead-in port 26, and the diameter of each is the same as the facing ports 16 and 26. Collectively, the cover portion 36 and the walls 33 may be considered as a cover member as recited in the appended claims.

The evaporated fuel released from main chamber 1 is once diffused at first chamber 3A, introduced from opening 31 into communication passage 34, passed through opening 32 and second chamber 3B and introduced into subchamber 2. At this time, since the fuel passage between main chamber 1 and subchamber 2 is sufficiently long, the molecular momentum of the fuel vapor is reduced and the evaporated fuel diffusion at the subchamber side can be firmly prevented, and since the diameters of openings 31 and 32 are sufficiently large, low pressure loss of the canister can be maintained. Further, as air chamber 3 can be compact, the canister itself will not be oversized.

Figure 2A:
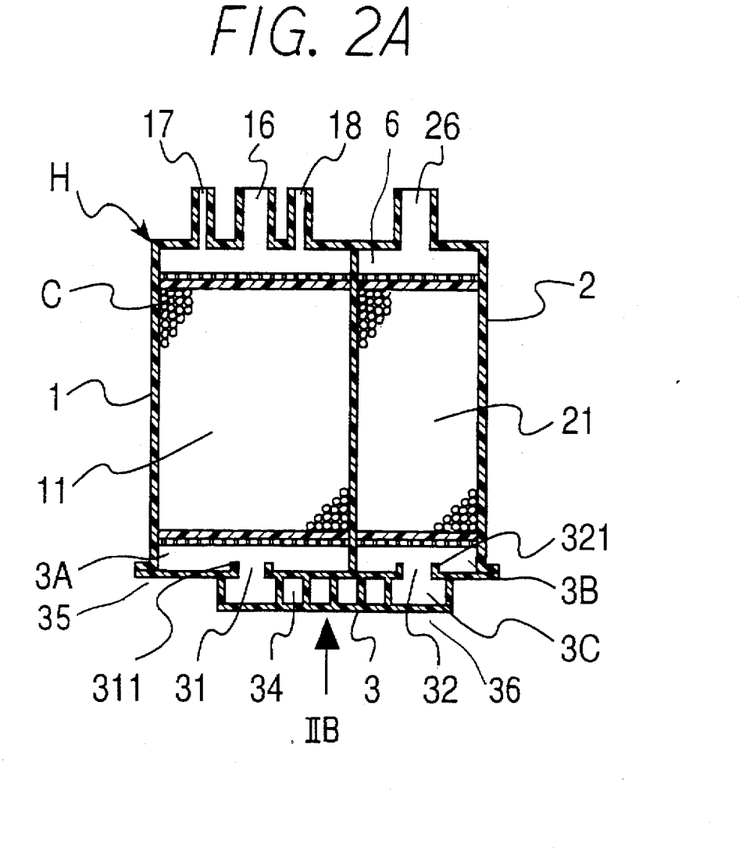
FIG. 2A is a cross-sectional view illustrating a canister according to a second embodiment of the present invention.
Figure 2B:
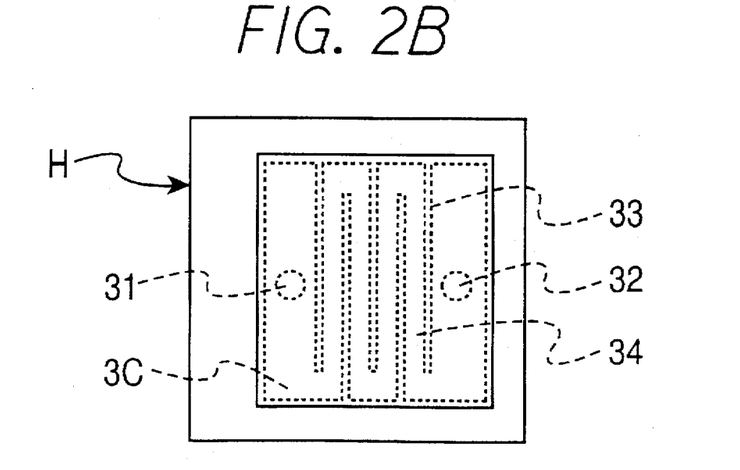
FIG. 2B is a view in the direction of the arrow IIB in FIG. 2A.

FIG. 2 illustrates a second embodiment of the present invention. According to the first embodiment, main chamber 1 and subchamber 2 are disposed vertically, but the present embodiment provides main chamber 1 and subchamber 2 by dividing a casing H into two chambers arranged horizontally side by side. Ribs 311 and 321 projecting upward at the entire periphery of the opening edges are provided at openings 31 and 32 connecting communication passage 34 of air chamber 3 to first chamber 3A and second chamber 3B.

When the canister is placed lengthwise, the adsorbed evaporated fuel is liquefied due to the temperature drop at night and accumulates at the bottom of first chamber 31 in air chamber 3. If this liquefied fuel gets into communication passage 34 in air chamber 3, the liquefied fuel is likely to be evaporated when the temperature rises and blown through subchamber 2. According to the structure of the second embodiment, rib 311 disposed at the edge of opening 31 prevents the liquefied fuel from going into the opening to reliably prevent the evaporated fuel from blowing through subchamber 2. As for subchamber 2, since the evaporated heat is released to the surroundings when the adsorbed fuel is purged, the vapor in the air is likely accumulated at the bottom of subchamber 2, but rib 321 disposed at the edge of opening 32 prevents the liquid drops from going into the opening in the same way.

Figure 3:
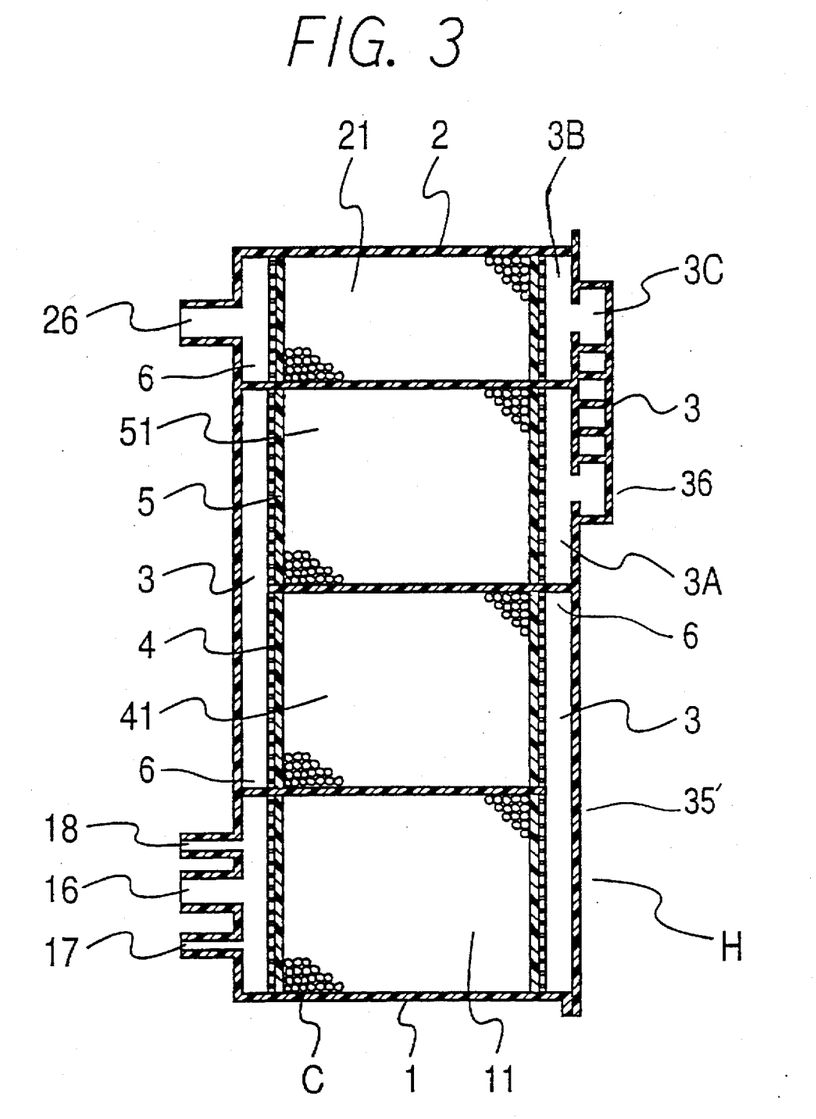
FIG. 3 is a cross-sectional view illustrating a canister according to a third embodiment of the present invention.

FIG. 3 illustrates a third embodiment of the present invention. According to the third embodiment, between main chamber 1 and subchamber 2 is provided a plurality of middle chambers 4 and 5 including adsorbent layers 41 and 51 filled with activated carbon C to make the total length of adsorbent layers longer. Each of middle chambers 4 and 5, main chamber 1 and subchamber 2 is connected to air chamber 3. The evaporated fuel is introduced from main chamber 1 through middle chambers 4 and 5 into subchamber 2, via air chamber 3 respectively. Further, air chamber 3 between middle chamber 5 and subchamber 2 is divided inside into three chambers: first chamber 3A, second chamber 3B and third chamber 3C, and communication passage 34 is provided in third chamber 3C in the same way as the first and second embodiments. Also, it can be seen that the casing portion 35' is extended to accommodate the middle chambers 4 and 5.

The present invention which provides communication passage 34 in air chamber 3 is applicable to a canister with three chambers or more, and the same effect as that of the first embodiment can be obtained. Furthermore, communication passage 34 may be disposed in other air chamber 3 or in a plurality of air chambers 3.

Figure 4A:
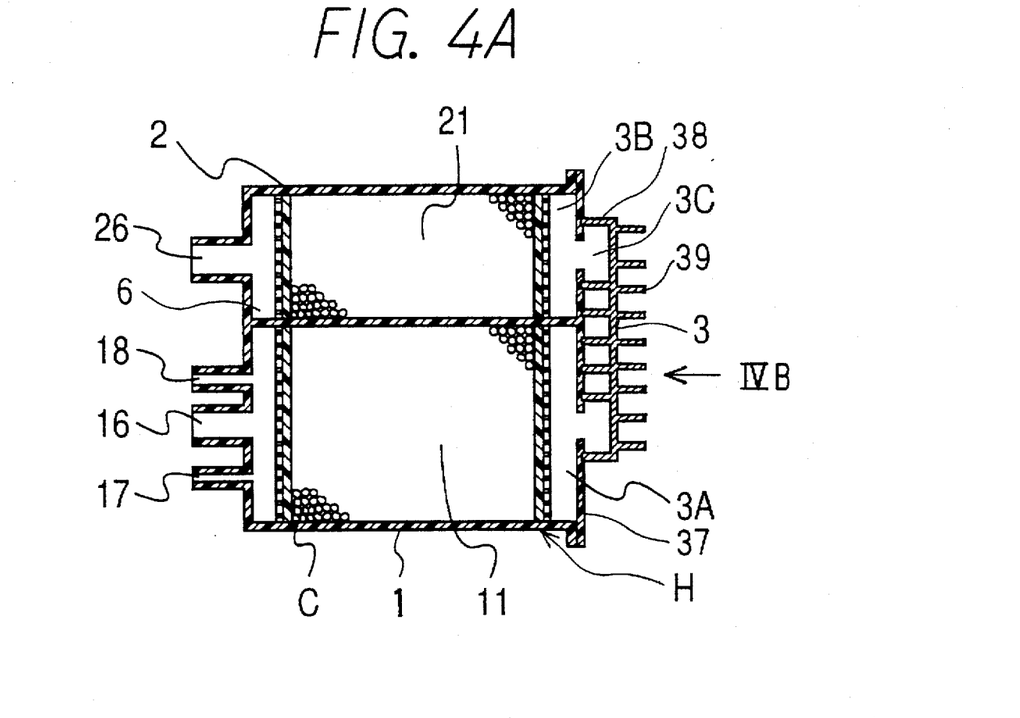
FIG. 4A is a cross-sectional view illustrating a canister according to a fourth embodiment of the present invention.
Figure 4B:
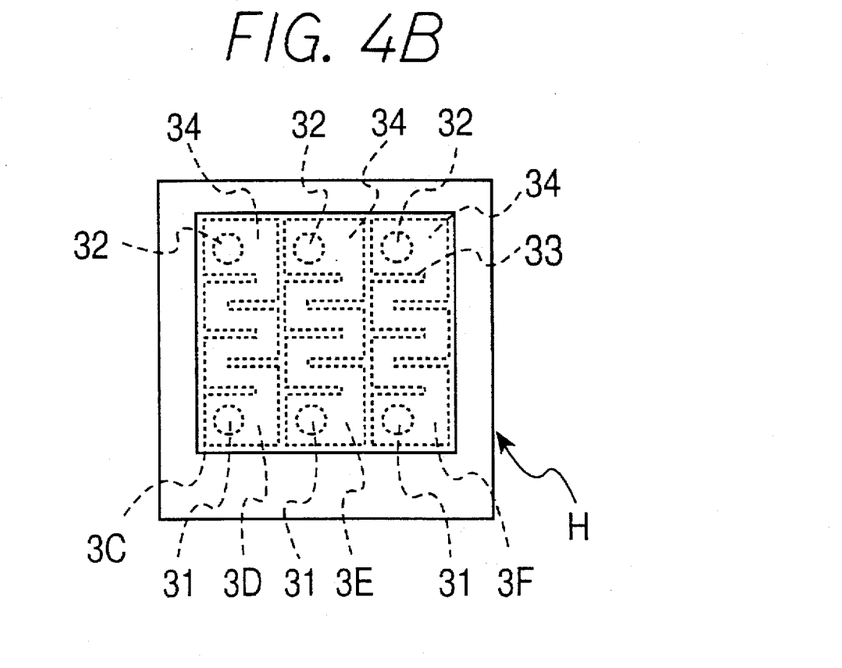
FIG. 4B is a view in the direction of the arrow IVB in FIG. 4A.

FIG. 4 illustrates a fourth embodiment of the present invention. According to the fourth embodiment, third chamber 3C of the above-mentioned air chamber 3 is further divided into three small chambers 3D, 3E and 3F. Each small chamber 3D, 3E and 3F is partitioned with partition wall 33 to form a series of each of communication passages 34. One end of communication passages 34 is connected to first chamber 3A at an opening 31 and another end of communication passage 34 is communicated with second chamber 3B at an opening 32.

When there is a single opening 31 which connects the above-mentioned first chamber 3A and third chamber 3C at the place facing fuel lead-in port 16, as the vapor flow is increased at an extension of fuel lead-in port 16, there is a possibility of the outer periphery of adsorbent layer 1 far away from opening 31, especially the activated carbon at a corner portion thereof being underutilized. According to the structure of the present embodiment, since the vapor flow from main chamber 1 to third chamber 3C via first chamber 3A is diverged into plural channels, the activated carbon at the corner portion can be efficiently utilized, thereby improving the adsorption efficiency. Further, plural openings 32 at the side of subchamber 2 improve the purge efficiency in purging the adsorbed fuel.

It also should be noted that in place of casing portion 35 or 25' and cover portion 36, this embodiment uses a thicker cover portion 37 receiving the partition walls 33 of cover portion 38. Cover portion 38 differs from cover portion 36 of the previous embodiments in that it has heat radiating fins 39 disposed on an exterior surface thereof to convey heat from evaporated fuel away from the canister. Acceptable results can be obtained if the cover portion 38 is made from resin; however, it is preferable that it be made from a material having higher thermal conductivity, e.g., a metal such as iron or steel.

According to the present embodiment, communication passage 34 in third chamber 3C is formed by providing partition walls 33 alternately, but the shape of communication passage 34 may be anything which can secure the designated passage length.

Figure 5:
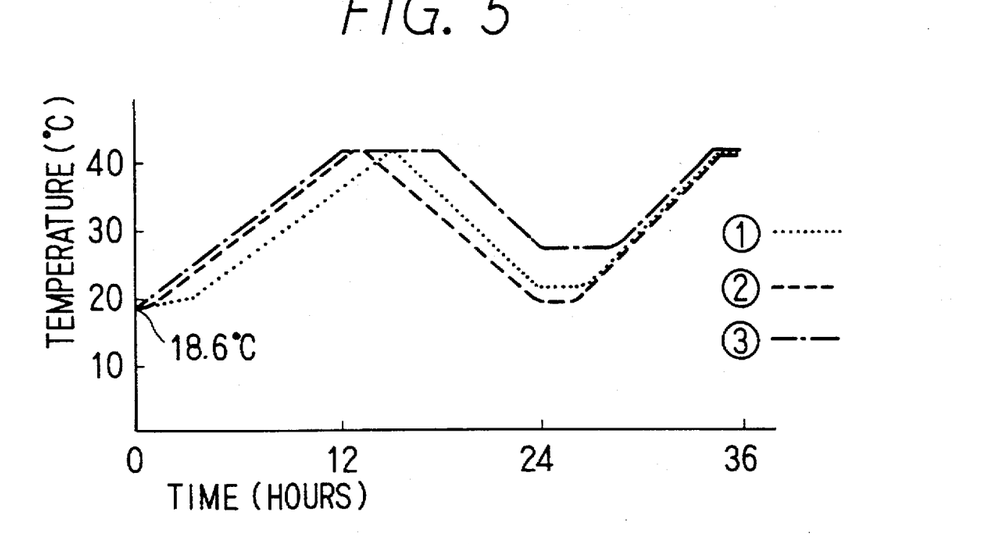
FIG. 5 is a graph showing changes in temperature of embodiments of the present invention and the prior art responsive to changes in environmental temperature.

FIG. 5 shows the experimental results of a comparison of temperature changes of the air chamber 3 in the present invention and the corresponding projecting pipe portion of the canister disclosed in the aforementioned Japanese Patent Application Laid-Open Nos. Hei 5-187330 and 5-187331 in response to changes in environmental temperature over a range of 18.6° C. to 40.7° C. Trace (1) represented by the dotted line shows temperature changes in the prior art design, while trace (2) shows changes in the present invention when the casing portion 35 and cover portion 36 are made from nylon 6, 6 and trace (3) shows changes in the present invention when the cover portion 38 is made from iron. As can be seen from the graph, the prior art design does not follow environmental temperature changes closely because the projecting pipe is not exposed to external air. In contrast, the present invention is very responsive to external temperature changes.

Figure 6:
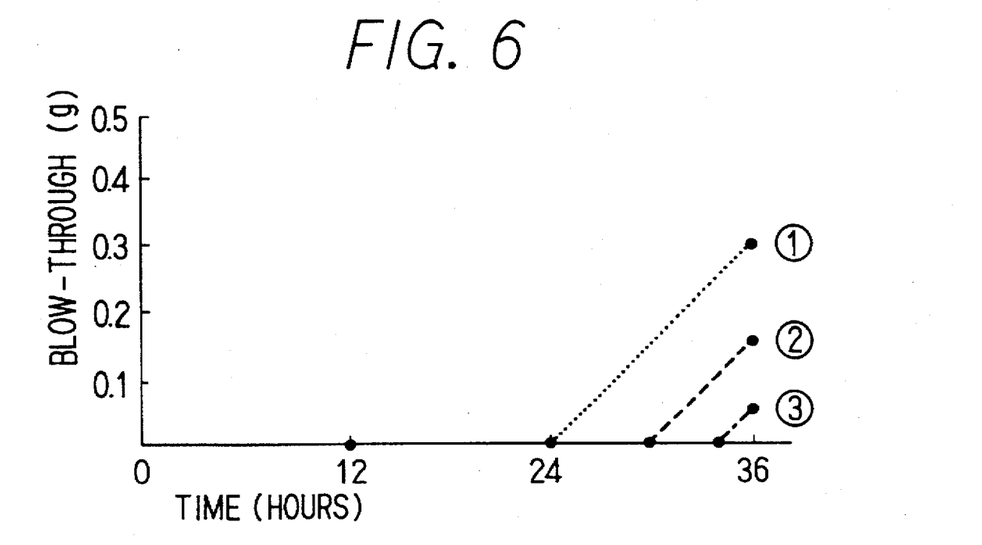
FIG. 6 is a graph showing blow-through rates of embodiments of the present invention compared to that of the prior art.

Further, FIG. 6 shows the experimental results of a comparison of blow-through rates of the various canister designs. As can be seen in the graph, trace (1) representing the prior art design has the highest blow-through rate, while the blow-through rates of the embodiment of the present invention are much smaller.

Accordingly, the present invention can surely prevent the diffusion of the evaporated fuel without increasing the pressure loss of the canister. Further, the present invention provides a simple-structured, highly practical canister without increasing the size thereof.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A canister comprising:
   a casing defining a main chamber having a first adsorbent layer disposed therein and a subchamber having a second adsorbent layer disposed therein, said first and second adsorbent layers being for adsorbing evaporated fuel;
   an evaporated fuel lead-in port and a purge port, each connected to said main chamber;
   an atmospheric air lead-in port connected to said subchamber; and
   a cover member disposed on said casing over holes in said casing so that said cover member and said casing cooperatively define a nonlinear communication passage connecting said main chamber to said subchamber through said holes, said cover member including a plurality of partition walls, disposed on and connected to an outermost wall of said cover member, defining a portion of the nonlinear communication passage.

2. The canister of claim 1, wherein said cover member is made from one of resin and metal.

3. The canister of claim 1, wherein said cover member is metal and includes a plurality of heat radiating fins disposed on an exterior surface thereof.

4. The canister of claim 1, wherein substantially an entire length of said communication passage is defined in part by said outermost wall of said cover member.

5. A canister comprising:
   a casing defining a main chamber having a first adsorbent layer disposed therein, a subchamber having a second adsorbent layer disposed therein, and a middle chamber assembly having at least one adsorbent layer disposed therein, said middle chamber assembly being disposed between said main chamber and said subchamber, said adsorbent layers being for adsorbing evaporated fuel;

an evaporated fuel lead-in port and a purge port, each connected to said main chamber;

an atmospheric air lead-in port connected to said subchamber;

an air chamber connecting said main chamber with said middle chamber assembly; and a cover member disposed on said casing over holes in said casing so that said cover member and said casing cooperatively define a nonlinear communication passage connecting said middle chamber assembly to said subchamber through said holes.

6. A canister comprising:

a casing defining a main chamber having a first adsorbent layer disposed therein, a first air chamber connected to said main chamber, a subchamber having a second adsorbent layer disposed therein and a second air chamber connected to said subchamber, said first and second adsorbent layers being for adsorbing evaporated fuel;

an evaporated fuel lead-in port and a purge port, each connected to said main chamber;

an atmospheric air lead-in port connected to said subchamber; and a cover member disposed on said casing over holes in said casing so that said cover member and said casing cooperatively define a third air chamber including a nonlinear communication passage connecting said first and second air chambers through said holes, said cover member including a plurality of partition walls, disposed on and connected to an outermost wall of said cover member, which define a portion of said nonlinear communication passage.

7. The canister of claim 6, wherein substantially an entire length of said communication passage is defined in part by said outermost wall of said cover member.

8. A canister comprising:

a casing defining a first chamber and a second chamber, each of said first and second chamber having adsorbent material disposed therein;

a fuel lead-in port and a purge port each connected to said first chamber;

an air lead-in port connected to said second chamber; and a member defining a communication path between said first and second chambers;

wherein a length of said communication path is longer than a distance from a first hole in said casing connecting an interior of said casing to said communication path to a second hole in said casing connecting said interior of said casing to said communication path, and a straight distance from a first end of said communication path to a second end of said communication path is substantially the same as a side of said canister on which said communication path is disposed;

a side of said member defining said communication path along substantially its entire length is an external wall of said canister for conveying heat away from said communication path; and said member includes a plurality of partition walls, disposed on and connected to an outermost wall of said member, which define a portion of said communication path.

9. The canister of claim 8, said casing comprising a rib, disposed around a periphery of each of said holes in said casing, for preventing liquid from entering said communication path.

10. The canister of claim 8, wherein said communication path directly connects said first and second chambers.

11. The canister of claim 8, further comprising:

an additional chamber disposed between said first chamber and said second chamber, said additional chamber being connected to said first chamber by one of said communication path and an air chamber.

12. The canister of claim 8, further comprising:

an additional chamber disposed between said first chamber and said second chamber, said additional chamber being connected to said second chamber by one of said communication path and an air chamber.

13. The canister of claim 8, said member comprising heat radiating fins disposed on said external wall of said canister for conveying heat energy away from said communication path.

14. The canister of claim 8, further comprising:

at least one additional hole in said casing between said first chamber and said member; and at least one additional hole in said casing between said second chamber and said member;

wherein said member defines at least one additional communication path connecting a respective one of said at least one additional hole between said first chamber and said member to a respective one of said at least one additional hole between said second chamber and said member.

15. The canister of claim 8, wherein substantially an entire length of said communication path is defined in part by said outermost wall of said member.

16. A canister comprising:

a casing defining a first chamber and a second chamber, each of said first and second chambers having adsorbent material disposed therein;

a fuel lead-in port and a purge port each connected to said first chamber;

an air lead-in port connected to said second chamber; and a member defining a communication path between said first and second chambers;

wherein a length of said communication path is longer than a distance from a first hole in said casing connecting an interior of said casing to said communication path to a second hole in said casing connecting said interior of said casing to said communication path;

said communication path includes a plurality of segments extending in a first direction and a plurality of segments extending in a second direction opposite said first direction; and said member includes a plurality of partition walls, disposed on and connected to an outermost wall of said member, which define a portion of said communication path.

17. The canister of claim 16, wherein:

said member includes a plurality of partition walls cooperatively defining said communication path in conjunction with said side of said member; and said communication path is a zig-zag shaped path.

18. The canister of claim 16, said casing comprising a rib, disposed around a periphery of each of said holes in said casing, for preventing liquid from entering said communication path.

19. The canister of claim 16, wherein said communication path directly connects said first and second chambers.

20. The canister of claim 16, further comprising:
an additional chamber disposed between said first chamber and said second chamber, said additional chamber being connected to said first chamber by one of said communication path and an air chamber.

21. The canister of claim 16, further comprising:
an additional chamber disposed between said first chamber and said second chamber, said additional chamber being connected to said second chamber by one of said communication path and an air chamber.

22. The canister of claim 16, said member comprising heat radiating fins disposed on said external wall of said canister for conveying heat energy away from said communication path.

23. The canister of claim 16, further comprising:
at least one additional hole in said casing between said first chamber and said member; and
at least one additional hole in said casing between said second chamber and said member;
wherein said member defines at least one additional communication path connecting a respective one of said at least one additional hole between said first chamber and said member to a respective one of said at least one additional hole between said second chamber and said member.

24. The canister of claim 16, wherein substantially an entire length of said communication path is defined in part by said outermost wall of said member.

25. A canister comprising:
a main chamber having an evaporated fuel lead-in port and a purge port and further including an adsorbent layer for adsorbing evaporated fuel;
a subchamber with an atmosphere port, said subchamber including an adsorbent layer for adsorbing evaporated fuel;
a casing for forming said main chamber and said subchamber;
a nonlinear communication passage for connecting said main chamber to said subchamber via respective holes in said casing; and
a cover member cooperating with said casing to define said nonlinear communication passage, said cover member having a partition wall disposed thereon and connected thereto;
wherein said nonlinear communication passage is formed inside of said cover member by employing said partition wall of said cover member, and said partition wall is a reinforcing member for said cover member.

26. The canister of claim 25, said casing comprising a rib, disposed around a periphery of each of said holes in said casing, for preventing liquid from entering said communication passage.

27. The canister of claim 25, wherein said communication passage directly contacts said main chamber and said subchamber.

28. The canister of claim 25, further comprising:
an additional chamber disposed between said main chamber and said subchamber, said additional chamber being connected to said main chamber by one of said communication passage and an air chamber.

29. The canister of claim 25, further comprising:
an additional chamber disposed between said main chamber and said subchamber, said additional chamber being connected to said subchamber by one of said communication passage and an air chamber.

30. The canister of claim 25, said member comprising heat radiating fins disposed on said external wall of said canister for conveying heat energy away from said communication passage.

31. The canister of claim 25, further comprising:
at least one additional hole in said casing between said main chamber and said member; and
at least one additional hole in said casing between said subchamber and said member;
wherein said member defines at least one additional communication passage connecting a respective one of said at least one additional hole between said main chamber and said member to a respective one of said at least one additional hole between said subchamber and said member.

32. The canister of claim 25, wherein:
said member includes a plurality of partition walls cooperatively defining said communication path in conjunction with said side of said member; and
said communication passage is a zig-zag shaped path.

* * * * *

UNITED STATES PATENT AND TRADEMARK OFFICE
CERTIFICATE OF CORRECTION

PATENT NO. : 5,743,943
DATED : April 28, 1998
INVENTOR(S) : MAEDA et al.

It is certified that error appears in the above-identified patent and that said Letters Patent is hereby corrected as shown below:

On title page,

Please add the Foreign Application Priority Data to read:

[30]   July 6, 1995        [JP]   Japan        7-195895

Signed and Sealed this

Seventh Day of September, 1999

Attest:

Q. TODD DICKINSON

Attesting Officer

Acting Commissioner of Patents and Trademarks